US005829762A

United States Patent [19]
Claramunt et al.

[11] Patent Number: 5,829,762
[45] Date of Patent: Nov. 3, 1998

[54] CHUCK WITH LOCKING UNIT

[75] Inventors: Dennis Claramunt, Anderson, S.C.; Ian Middleton, Chesterfield, England

[73] Assignee: Power Tool Holders Incorporated, Wilmington, Del.

[21] Appl. No.: 840,524

[22] Filed: Apr. 21, 1997

[51] Int. Cl.⁶ ..................................................... B23B 31/12
[52] U.S. Cl. ............................ 279/62; 279/140; 279/902
[58] Field of Search ................................ 279/61, 62, 140, 279/902

[56] References Cited

U.S. PATENT DOCUMENTS

| | | |
|---|---|---|
| 5,190,423 | 3/1993 | Ewing . |
| 5,215,317 | 6/1993 | Jordan et al. ............................ 279/140 |
| 5,348,317 | 9/1994 | Steadings et al. . |
| 5,411,275 | 5/1995 | Huff et al. ............................... 279/140 |
| 5,615,899 | 4/1997 | Sakamaki et al. ....................... 279/140 |

*Primary Examiner*—Steven C. Bishop
*Attorney, Agent, or Firm*—Dority & Manning, P.A.

[57] ABSTRACT

A chuck for use with a manual or powered driver having a rotatable drive shaft is provided. The chuck includes a plurality of jaws slidably positioned in angularly disposed passageways in a body member. Each of the jaws has a jaw face formed on one side and threads formed on the other. A nut includes axially aligned threaded sections. Each of the sections is rotatably mounted on the body in engagement with the jaw threads. A generally cylindrical front sleeve member is in driving engagement with the nut whereby the jaws will be moved by the nut when the front sleeve member is rotated with respect to the body. The first section and the second section are rotated with respect to each other when the jaws are in a gripping engagement with a tool shaft.

18 Claims, 3 Drawing Sheets

CHUCK WITH LOCKING UNIT

BACKGROUND OF THE INVENTION

The present invention relates generally to chucks for use with drills or with electric or pneumatic power drivers. More particularly, the present invention relates to a chuck of the keyless type which may be tightened or loosened by hand or by actuation of the driver motor.

Both hand tool drivers and electric or pneumatic tool drivers are well known. Although twist drills are the most common tools used with such drivers, screw drivers, nut drivers, burrs, mounted grinding stones and other cutting or abrading tools may also be used. Since the tools may have shanks of varying diameter or of polygonal cross section, the device is usually provided with a chuck that is adjustable over a relatively wide range. The chuck may be attached to the driver by a graded or tapered bore.

A wide variety of chucks have been developed in the art. In the simplest form, three jaws spaced circumferentially approximately 120° apart from each other are constrained by angularly disposed passageways in a body attached onto the drive shaft and configured so that rotation of the body in one direction relative to a constrained nut engaging the jaws forces the jaws into gripping relationship with respect to the cylindrical shank of the tool, while rotation in the opposite direction releases the gripping relationship. Such a chuck may be keyless if it is rotated by hand. One example of such a chuck is disclosed in U.S. Pat. No. 5,125,673 entitled "Non-impact Keyless Chuck" and commonly assigned to the present assignee, the entire disclosure of which is incorporated by reference herein.

When such a chuck is tightened, the jaws eventually stop in a gripping relationship with a tool shaft, and the nut is then urged rearward by the jaw threads. Typically, the nut bears against the body, for example via a thrust ring or a bearing inserted between the nut and a thrust ring, when forced rearward. Further rotation of the nut wedges the nut between the jaw threads and the body, resisting further tightening rotation and bringing the chuck into a tightened condition.

The wedged nut, which is generally maintained in its rotational position by friction, maintains the jaws in their gripping relation to the tool shaft. The tightened condition of the chuck, however, depends upon the maintenance of the axial forces between the tool shaft and the body through the jaws, the nut, and the bearing (if present). Use of the chuck, particularly in hammer drills, may cause vibrations which temporarily alter these forces and which may cause the nut to move in either rotational direction so that the chuck is undesirably tightened or loosened.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide a chuck that remains tightened while in use.

These and other objects are achieved by providing a chuck for use with a manual or powered driver having a rotatable drive shaft. The chuck comprises a generally cylindrical body member having a nose section and a tail section. The tail section has an axial bore formed therein to mate with the drive shaft of the driver. The nose section has an axial bore formed therein and a plurality of angularly disposed passageways formed therethrough and intersecting the axial bore. A plurality of jaws are slidably positioned in each of the angularly disposed passageways. Each of the jaws has a jaw face formed on one side thereof and threads formed on the opposite side thereof.

A nut includes axially aligned threaded sections. A first section is rotatably mounted on the body in engagement with the threads on the jaws. A second section is also rotatably mounted on the body in engagement with the threads on the jaws. A generally cylindrical front sleeve member is in driving engagement with the nut whereby the jaws will be moved by the nut when the front sleeve member is rotated with respect to the body member, and whereby the first section and the second section are rotated with respect to each other when the jaws are in a tightened gripping engagement with a tool shaft.

These and other objects are also accomplished by providing a chuck for use with a manual or powered driver having a rotatable drive shaft. The chuck comprises a generally cylindrical body member having a nose section and a tail section. The tail section has an axial bore formed therein to mate with the drive shaft of the driver, and the nose section has an axial bore formed therein and a plurality of angularly disposed passageways formed therethrough and intersecting the axial bore. A plurality of jaws are slidably positioned in each of the angularly disposed passageways, each of the jaws having a jaw face formed on one side thereof and threads formed on the opposite side thereof.

A nut includes axially aligned threaded annular sections. A first section is rotatably mounted on the body in engagement with the threads on the jaws. A second section is rotatably mounted on the body rearward of the first section with respect to the body in engagement with the threads on the jaws and in frictional engagement with the first section. A generally cylindrical front sleeve member is in driving engagement with the first section whereby the jaws will be moved by the nut when the front sleeve member is rotated with respect to the body member. A thrust ring is fixed on the body member axially rearward of the second section so that the second section bears upon the thrust ring when the jaws are in a tightened gripping engagement with a tool shaft.

The relative rotation of the second section with respect to the first section causes the threads on the sections to mismatch and causes the two sections to push in opposite directions against the jaw threads, locking the sections to the jaws. The lock is substantially independent of the force applied to the nut by the tool shaft through the jaws or the force applied to the nut from the body, although these forces are used to put the sections into the locked conditions. Once in this position the lock will ordinarily be maintained until released by reverse rotation of the sleeve.

Accordingly, the nut substantially maintains its position with respect to the jaws during typical vibrations experienced during use of the chuck. Thus, the chuck ordinarily does not undesirably loosen or tighten, and the gripping position of the jaws on the tool shaft is maintained.

The accompanying drawings, which are incorporated in and constitute a part of this specification, illustrate two preferred embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
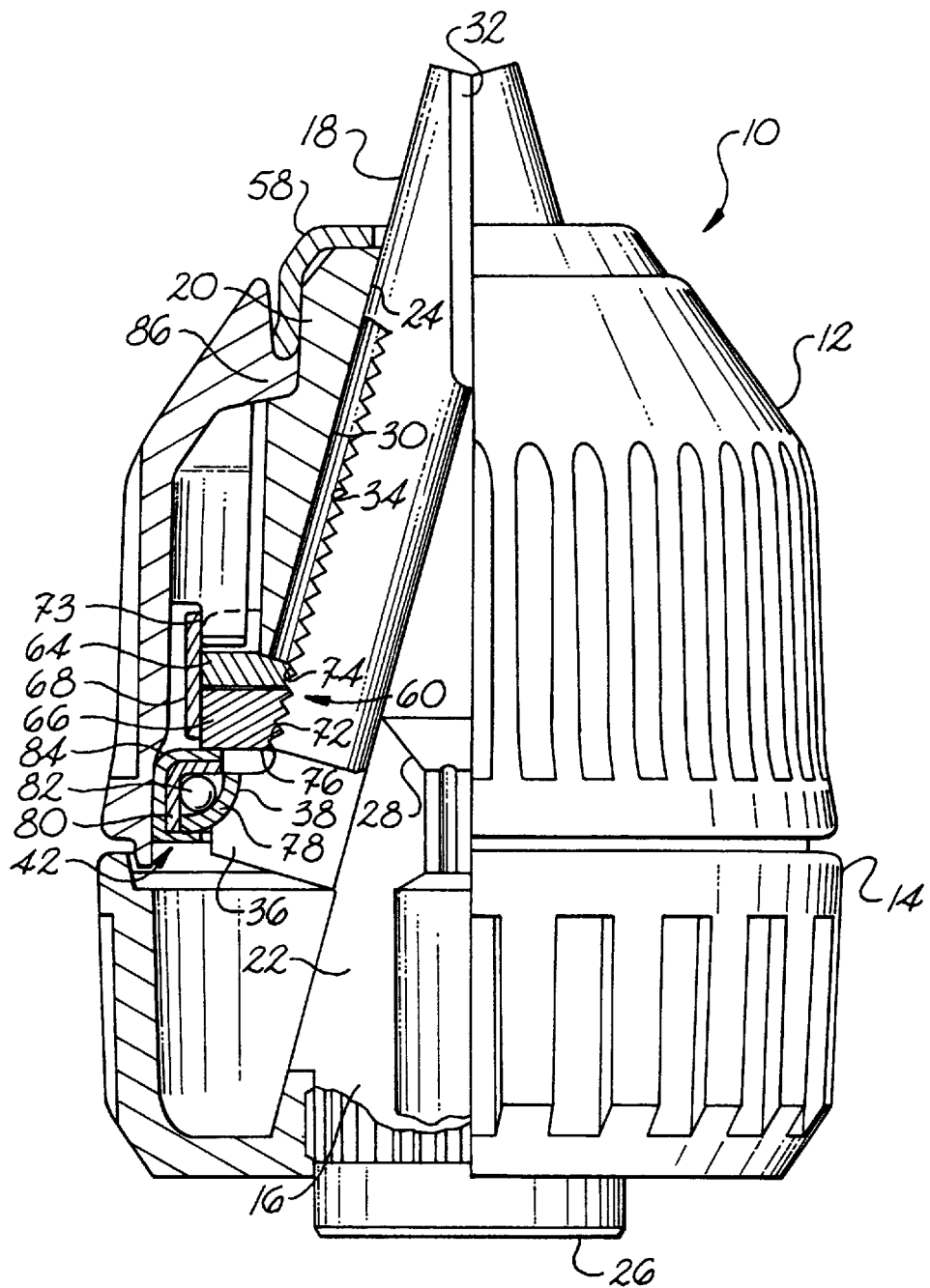
FIG. 1 is a longitudinal view, partly in section, of a chuck constructed in accordance with the present invention.

Repeat use of reference characters in the present specification and drawings is intended to represent same or analogous features or elements of the invention.

DETAILED DESCRIPTION OF PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
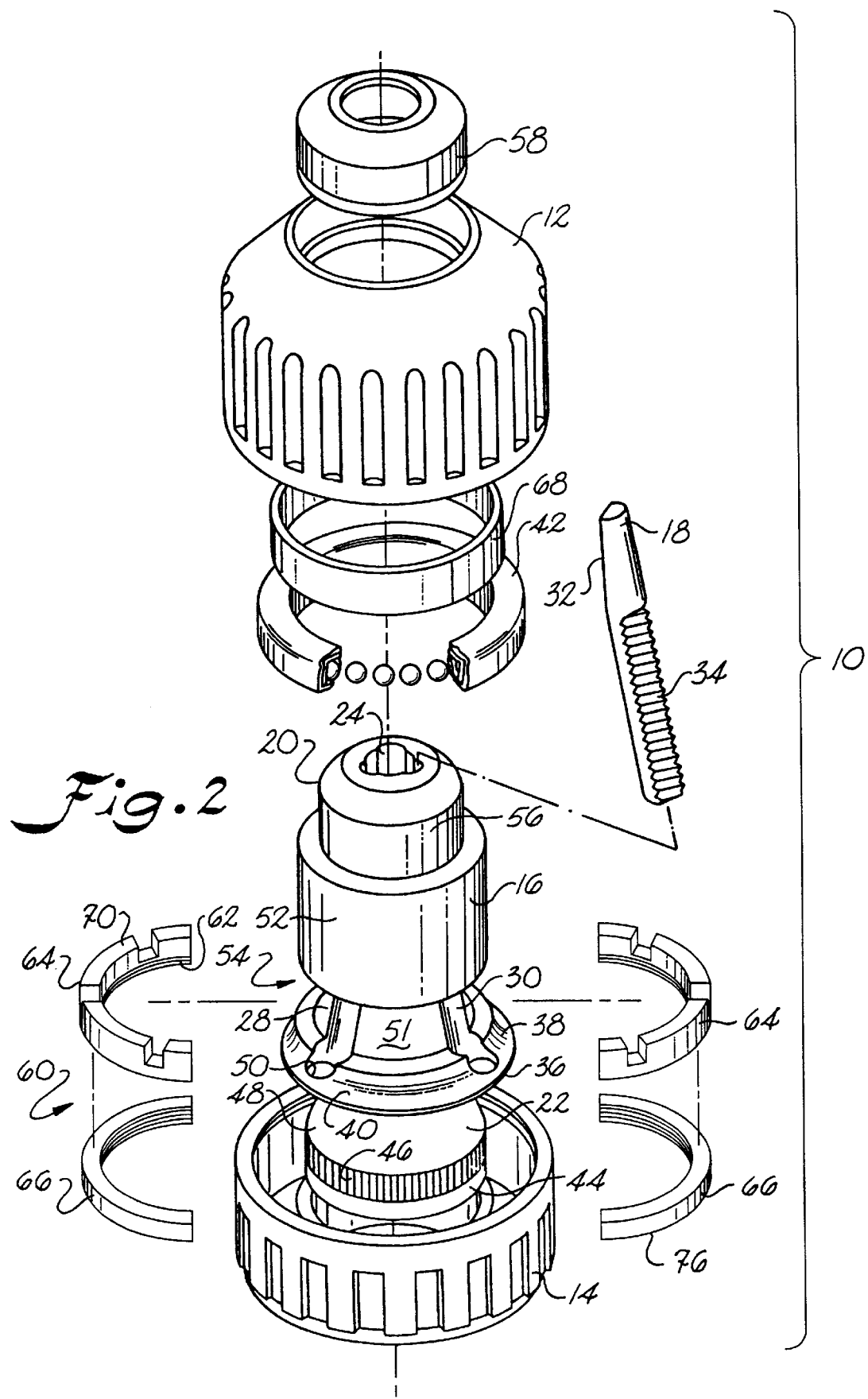
FIG. 2 is an exploded view of a chuck constructed in accordance with the present invention.

Referring to FIGS. 1 and 2, a chuck 10 in accordance with the present invention is illustrated. Chuck 10 includes a front sleeve member 12, an optional rear sleeve member 14, a body member 16 and jaws 18. Body member 16 is generally cylindrical in shape and comprises a nose or forward section 20 and a tail or rearward section 22. An axial bore 24 is formed in the nose section 20 of the body member 16. Axial bore 24 is somewhat larger than the largest tool shank that the chuck is designed to accommodate. A threaded bore 26 is formed in tail section 22 of body 16 and is of a standard size to mate with the drive shaft of a powered or hand driver (not shown). The bores 24 and 26 may communicate at the central region 28 of body member 16. While a threaded bore 26 is illustrated, such bore could be replaced with a tapered bore of a standard size to mate with a tapered drive shaft.

Passageways 30 are formed in body member 16 to accommodate each jaw 18. Preferably, three jaws 18 are employed, and each jaw 18 is separated from the adjacent jaw by an arc of approximately 120°. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of chuck body 16 and threads 34 on its opposite or outer surface.

Body member 16 includes a thrust ring 36 which is preferably integral with body 16. Thrust ring 36 incudes a thrust face 38 which may include an arcuate seating surface 40 for engagement with the inner race of a self-contained anti-friction bearing assembly 42. Thrust ring 36 includes a plurality of jaw guideways 50 formed around its circumference to permit retraction of the jaws 18. Of course, any thrust ring and/or bearing configuration could be utilized.

Body member 16 includes a rear cylindrical portion 44 with a knurled surface 46 thereon for receipt of optional rear sleeve 14 to be pressed thereon if so desired. Body 16 further includes a first tapered portion 48 extended from rear cylindrical portion 44 to thrust ring 36. A second tapered portion 51 extends from the area of the thrust face 38 to a front cylindrical portion 52. Front cylindrical portion 52 is of greater diameter than the smaller end of second tapered portion 51 and forms a first circumferential groove 54 intermediate the nose and tail sections 20 and 22 of body 16. Body 16 further includes a reduced diameter nose portion 56 that is adapted to receive a nosepiece 58.

Figure 3:
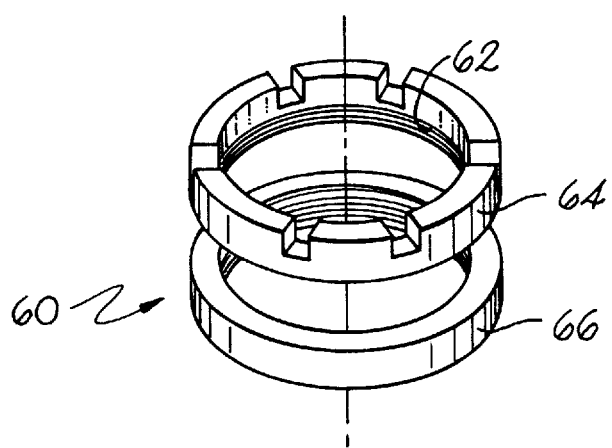
FIG. 3 is an exploded view of a chuck nut constructed in accordance with the present invention.

A nut 60 includes threads 62 for mating with threads 34 on jaws 18 whereby when the nut is rotated with respect to the body, the jaws will be advanced or retracted. Nut 60 includes a front section 64 and a rear section 66 disposed axially behind front section 64 with respect to the body. Both front section 64 and rear section 66 are axially split into halves and are therefore adapted to receive a retaining band 68 to assist in maintaining nut 60 together after assembly. It should be appreciated that sleeve 12 could be utilized to maintain nut 60 together without a band. In another preferred embodiment as shown in FIG. 3, each section 64 and 66 is unitarily constructed, and no retaining band is utilized. Various suitable chuck constructions may be employed to accommodate the unitary sections.

Referring again to FIGS. 1 and 2, front section 64 includes drive slots 70 for mating with drive ribs 73 on front sleeve 12 so that when front sleeve 12 is rotated, front section 64 rotates with the sleeve and moves jaws 18. In another preferred embodiment, the front sleeve may be press fit to the front section.

The threads of, and the interface between, front section 64 and rear section 66 may be lubricated with a suitable lubricant, for example molybdenum disulfide grease. Despite the lubricant, a frictional interface exists between front section 64 and rear section 66 so that rear section 66 turns with front section 64 as front sleeve 12 is rotated in the tightening direction.

When jaws 18 reach a closed position, for example against a tool shaft, their movement in a forward direction is resisted. Continued rotation of nut 60 creates a rearward force from the jaws through the threads of front section 64 and rear section 66 to thrust ring 36 via bearing assembly 42. At this point, friction between the threads of rear section 66 and the jaw threads overcomes the friction between rear section 66 and front section 64 and stops rotation of rear section 66 with respect to body 16.

Thereafter, when front section 64 is further rotated to its fully tightened position, front section 64 applies a rearward force to rear section 66, causing the threads of rear section 66 to bear against front faces 72 of jaw threads 34. The threads of front section 64, which are now mismatched with respect to the threads of rear section 66, bear against rear faces 74 of jaw threads 34. Front section 64 and rear section 66 bear against each other at their interface in opposition to these forces. The mismatched threads thus tend to lock front section 64 and rear section 66 to the jaws, thereby substantially preventing movement of nut 60 with respect to the jaws that could cause undesirable tightening or loosening of the chuck during use.

To release the locked nut, sleeve 12 is rotated in the loosening direction. This brings the threads of front section 64 and rear section 66 back into alignment and releases the lock. Although front section 64 is urged away from rear section 66 as it rotates in the loosening direction, sufficient friction typically exists to rotate rear section 66 with front section 64. In this way, the chuck may be opened.

Contaminants may, however, inhibit the rotation of the rear section when the chuck is turned in the releasing direction. Accordingly, mechanisms may be provided to apply torque directly from the sleeve to both the front section and the rear section. This aids in both tightening and loosening. Additionally, the front section may cooperate with the rear section so that the front section catches the rear section as the front section rotates back in a releasing direction when the front section threads and the rear section threads become aligned.

In a preferred embodiment, a self-contained bearing assembly 42 is adapted to be placed between thrust ring 36 and end face 76 of rear section 66. Self-contained bearing assembly 42 includes an inner race 78, an outer race 80 and bearing elements 82 maintained therebetween. In a preferred embodiment, bearing elements 82 are ball bearings. Self-contained bearing assembly 42 may further include a shroud 84 surrounding the inner and outer races 78 and 80 for maintaining the bearing assembly as a self-contained component. Inner race 78 may include an arcuate surface that is dimensioned and configured to mate with arcuate seating surface 40 on thrust face 38 of thrust ring 36. Such mating relationship assists in alignment and minimization of stresses when the chuck is operated. In one preferred embodiment, self-contained bearing assembly 42 may be a radial thrust bearing.

Use of a self-contained bearing assembly simplifies assembly in that individual ball bearings and cages do not have to be handled. In addition, the body and nut are not required to be as hard or dense as is necessary with conventional bearing systems where the body or nut may also serve as a thrust race, thus allowing more flexibility in materials and reducing secondary manufacturing operations and, ultimately, cost.

Front sleeve 12 is adapted to be loosely fitted over nose section 20 of chuck 10. Drive ribs 73 of front sleeve 12 engage drive slots 70 of front section 64 so that front sleeve 12 and front section 64 will be operatively connected. That is, when front sleeve 12 is rotated, front section 64 will rotate therewith. Front sleeve 12 includes an annular ledge portion 86 adapted to rest at the interface of front cylindrical portion 52 and nose portion 56. Nosepiece 58 is dimensioned and adapted to be pressed onto nose portion 56 to maintain front sleeve 12 on chuck 10. It should be appreciated that nosepiece 58 could also be secured by snap fit, threading or the like. Nosepiece 58 is exposed when the chuck is assembled and is preferably coated with a non-ferrous metallic coating to prevent rust and to enhance its appearance. While such coating may be, for example, zinc or nickel, it should be appreciated that any suitable coating could be utilized.

The operation of a nosepiece such as nosepiece 58 is disclosed in U.S. Pat. No. 5,348,317, the disclosure of which is fully incorporated herein by reference.

While the above description is set forth with respect to a keyless chuck, it should be appreciated that the principles of the present invention are equally applicable to a keyed chuck. Furthermore, it should be understood that various suitable chuck constructions could be employed. For example, the bearing may be omitted so that the rear section 66 bears directly on the body in some fashion. Furthermore, the chuck may be constructed so that the front sleeve drives the rear nut section and so that the rear nut section drives the front nut section by the frictional interface between the sections.

Accordingly, while preferred embodiments of the invention have been described above, it is to be understood that any and all equivalent realizations of the present invention are included within the scope and spirit thereof. Thus, the embodiments depicted are presented by way of example only and are not intended as limitations upon the present invention, and those of ordinary skill is this art should understand that many modifications may be made. Therefore, it is contemplated that any and all such embodiments are included in the present invention as may fall within the literal or equivalent scope of the appended claims.

What is claimed is:

1. A chuck for use with a manual or powered driver having a rotatable drive shaft, said chuck comprising:
   a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;
   a plurality of jaws slidably positioned in each of said angularly disposed passageways, each of said jaws having a jaw face formed on one side thereof and threads formed on the opposite side thereof;
   a nut including axially aligned threaded sections, a first said section rotatably mounted on said body in engagement with said threads on said jaws and a second said section rotatably mounted on said body in engagement with said threads on said jaws; and
   a generally cylindrical front sleeve member in driving engagement with said nut whereby said jaws will be moved by said nut when said front sleeve member is rotated with respect to said body member, and whereby said first section and said second section are rotated with respect to each other when said jaws are in a gripping engagement with a tool shaft.

2. The chuck as in claim 1, wherein each of said first section and said second section has a substantially annular shape extending around said body.

3. The chuck as in claim 2, wherein each of said first section and said second section is axially split into at least two pieces.

4. The chuck as in claim 2, wherein said first section is of a unitary construction and said second section is of a unitary construction.

5. The chuck as in claim 1, wherein said first section is axially forward of said second section with respect to said body.

6. The chuck as in claim 5, wherein said sleeve is in driving engagement with said first section.

7. The chuck as in claim 6, wherein said first section rotationally drives said second section by a frictional interface between said first section and said second section when said sleeve rotates in a tightening direction.

8. The chuck as in claim 7, including a thrust ring fixed on said body member axially rearward of said second section with respect to said body member so that said second section bears upon said thrust ring when said jaws grip said tool shaft.

9. The chuck as in claim 8, including a bearing assembly disposed between said second section and said thrust ring.

10. The chuck as in claim 8, wherein said thrust ring is unitary with said body.

11. The chuck as in claim 6, wherein said sleeve member includes drive ribs and wherein said first section includes drive slots for receipt of said drive ribs.

12. The chuck as in claim 6, wherein said sleeve member is press fit to said first section.

13. The chuck as in claim 1, wherein said first section and said second section are nonunitarily constructed sections.

14. A chuck for use with a manual or powered driver having a rotatable drive shaft, said chuck comprising:

a generally cylindrical body member having a nose section and a tail section, said tail section having an axial bore formed therein to mate with said drive shaft of said driver and said nose section having an axial bore formed therein and a plurality of angularly disposed passageways formed therethrough and intersecting said axial bore;

a plurality of jaws slidably positioned in each of said angularly disposed passageways, each of said jaws having a jaw face formed on one side thereof and threads formed on the opposite side thereof;

a nut including axially aligned threaded annular sections, a first said section rotatably mounted on said body in engagement with said threads on said jaws and a second said section rotatably mounted on said body rearward of said first section with respect to said body in engagement with said threads on said jaws and in frictional engagement with said first section;

a generally cylindrical front sleeve member in driving engagement with said first section whereby said jaws will be moved by said nut when said front sleeve member is rotated with respect to said body member; and a thrust ring fixed on said body member axially rearward of said second section so that said second section bears upon said thrust ring when said jaws are in gripping engagement with a tool shaft.

15. The chuck as in claim 14, wherein said thrust ring is unitary with said body.

16. The chuck as in claim 14, including a bearing assembly disposed between said second section and said thrust ring.

17. The chuck as in claim 16, wherein said bearing assembly is a self-contained anti-friction bearing assembly having an inner race, an outer race, and bearing elements cooperating together.

18. The chuck as in claim 17, wherein said bearing elements are ball bearings.

\* \* \* \* \*

UNITED STATES PATENT AND TRADEMARK OFFICE
CERTIFICATE OF CORRECTION

PATENT NO. : 5,829,762
DATED : November 3, 1998
INVENTOR(S) : Dennis Claramunt et al.

It is certified that error appears in the above-indentified patent and that said Letters Patent is hereby corrected as shown below:

On the title page: Item [54] and Column 1, line 2,

Please change the word "UNIT" to --NUT--.

Signed and Sealed this

Twenty-ninth Day of February, 2000

Attest:

Q. TODD DICKINSON

Attesting Officer

Commissioner of Patents and Trademarks